United States Patent [19]

Imaizumi et al.

[11] Patent Number: 4,635,506
[45] Date of Patent: Jan. 13, 1987

[54] GEARBOX ASSEMBLY FOR VEHICLES

[75] Inventors: Masahiro Imaizumi; Masanori Masumura, both of Saitama; Takeshi Ishikawa, Tokyo; Eiji Hosoya, Saitama, all of Japan

[73] Assignee: Honda Giken Kogyo Kabushiki Kaisha, Tokyo, Japan

[21] Appl. No.: 542,290

[22] Filed: Oct. 14, 1983

[30] Foreign Application Priority Data

Oct. 15, 1982 [JP] Japan .................. 57-179778
Oct. 15, 1982 [JP] Japan .................. 57-179779

[51] Int. Cl.$^4$ .......... F16H 3/02; F16H 5/06; F16H 57/06
[52] U.S. Cl. .......... 74/745; 74/337.5; 74/474; 74/476; 74/359
[58] Field of Search ........ 74/476, 477, 745, 333, 74/345, 474, 337.5, 355, 359; 180/226, 230, 215

[56] References Cited

U.S. PATENT DOCUMENTS

| | | | |
|---|---|---|---|
| 829,242 | 8/1906 | Warner | 74/345 |
| 3,546,951 | 12/1970 | Ausdau | 74/345 X |
| 4,126,055 | 11/1978 | Forsyth | 74/476 |
| 4,275,614 | 6/1981 | Okubo et al. | 74/476 |
| 4,373,601 | 2/1983 | Onda et al. | 74/745 X |
| 4,455,884 | 6/1984 | Tsuruta et al. | 74/474 X |
| 4,459,874 | 7/1984 | Suzuki | 74/745 |
| 4,462,273 | 7/1984 | Yoshii et al. | 74/745 |
| 4,466,306 | 8/1984 | Katayma | 74/477 |
| 4,484,489 | 11/1984 | Boutant | 74/477 X |
| 4,523,491 | 6/1985 | Dittmann | 74/333 X |

FOREIGN PATENT DOCUMENTS

| | | | |
|---|---|---|---|
| 805738 | 5/1951 | Fed. Rep. of Germany | 74/359 |
| 1202665 | 10/1965 | Fed. Rep. of Germany | 180/230 |
| 1905179 | 10/1969 | Fed. Rep. of Germany | 74/701 |
| 1132172 | 3/1957 | France | 74/745 |
| 1225465 | 7/1960 | France | 74/745 |
| 56-24259 | 3/1981 | Japan | 74/476 |
| 57-12163 | 1/1982 | Japan | 74/477 |
| 154548 | 9/1982 | Japan | 74/337.5 |
| 57-16134 | 10/1982 | Japan | 74/476 |

Primary Examiner—Kenneth J. Dorner
Assistant Examiner—Joseph M. Rolnicki
Attorney, Agent, or Firm—Sughrue, Mion, Zinn, Macpeak, and Seas

[57] ABSTRACT

A transmission system for a motorcycle or motorized tricycle, comprising a main gearbox 3 having multiple gear steps, a sub gearbox 4 coupled to the main gearbox having two widely spaced forward gears GL, GH and one reverse gear GR; and one shift lever 14 controlling the selection of the gears in the sub gearbox. The reverse gear may be interlocked with the neutral and lowest speed gear of the main gearbox.

2 Claims, 13 Drawing Figures

GEARBOX ASSEMBLY FOR VEHICLES

BACKGROUND OF THE INVENTION

This invention relates to a gearbox assembly for vehicles applicable, particularly, to motorcycles, motorized tricycles, scooters or automobiles of a bar handle type designed for use off-road or on rough roads.

Conventional vehicles for rough road and field use are, generally, equipped with an engine and a gearbox similar to those of a highway motorcycle. However, because a large driving torque, which is required to get out of depressions, cannot be obtained from such a gearbox, it has become desirable to obtain the required driving torque by treating the conventional gearbox as a main gearbox, adding a sub gearbox and providing gear-shifting to a low speed in the sub gearbox. It is also desired to provide the feature of backward motion with a reversing gear. In the above, though a reversing transmission system can be incorporated in the main gearbox, this requires a nearly complete redesign of the main gearbox. Futher, because the main gearbox undergoes frequent gear shifting operation though pedal manipulation, incorporation of the reversing system into the main gearbox produces operational problems.

Further, the sub gearbox is usually mounted at a displaced position relative to the main gearbox, so it is unnecessary to adjust the width of the vehicle frame and to pay attention in designing the position of a foot-rest step relative to the gearboxes.

SUMMARY OF THE INVENTION

This invention, which is intended to overcome the foregoing problems, relates to a gearbox assembly for vehicles in which an output of an engine is transmitted to the driving wheels of a vehicle through a main gearbox having plural forward gear-shaft steps and a lever-operated sub gearbox having at least two relatively high and low gear-shift steps. Further, the sub gearbox is provided with a reverse or backward motion transmission system which is selectively established by a switching operation of one common shift lever of the sub gearbox.

Another object of this invention is to provide the gearbox assembly in which the sub gearbox is prevented from shifting to reverse except when the main gearbox is in neutral or in a low speed gear-shift step.

To achieve the above, the sub gearbox is provided with a stopper mechanism which engages a rotary member for gear-shift operation included in the sub gearbox. The stopper mechanism functions to prevent the rotary member from shifting to a reversing position which determines the reverse mode of operation. The stopper mechanism is interlinked to a gear-shift mechanism of the main gearbox so that the preventive stopper mechanism is released only when the main gearbox is in neutral or in a low speed gear-shift step.

Still another object of this invention is to provide a compact gearbox assembly for vehicles having a small frame, particularly, along a transverse direction of the vehicle. To achieve the above, the gearbox assembly according to this invention has the engine and the following main gearbox mounted along a longitudinal direction at a center portion of the frame of a two-wheel vehicle. The sub gearbox following the main gearbox is mounted at a position displaced to one side of the main gearbox. Further, a power shaft included in the sub gearbox is positioned at a medial position corresponding to the position of the main gearbox and is interlinked to a drive shaft extending rearwards.

DETAILED DESCRIPTION OF THE PREFERRED EMBODIMENTS

A first embodiment of this invention will be described with reference to FIGS. 1 to 4.

Figure 1:
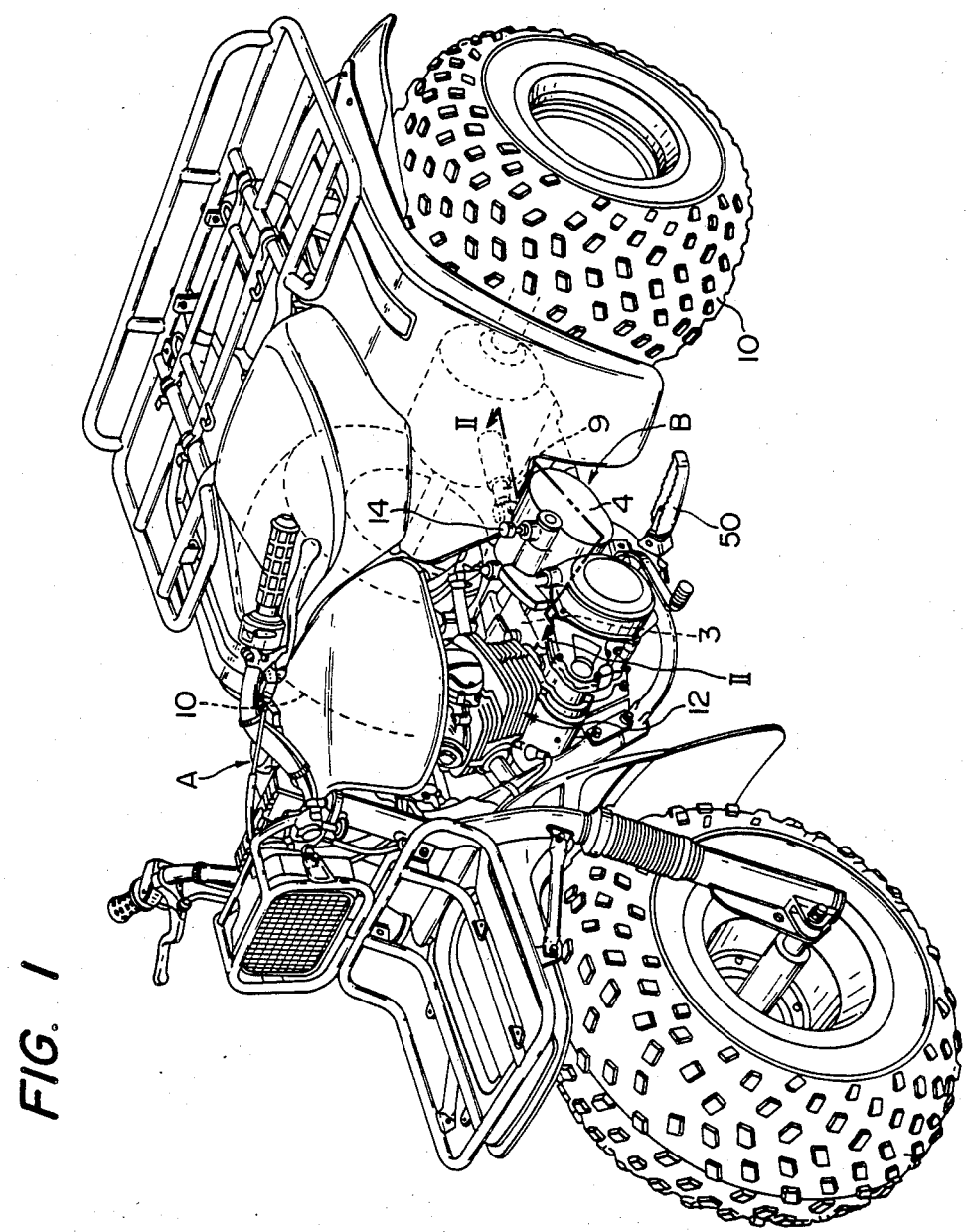
FIG. 1 is a perspective view showing an exemplary vehicle provided with an assembly according to this invention.
Figure 2:
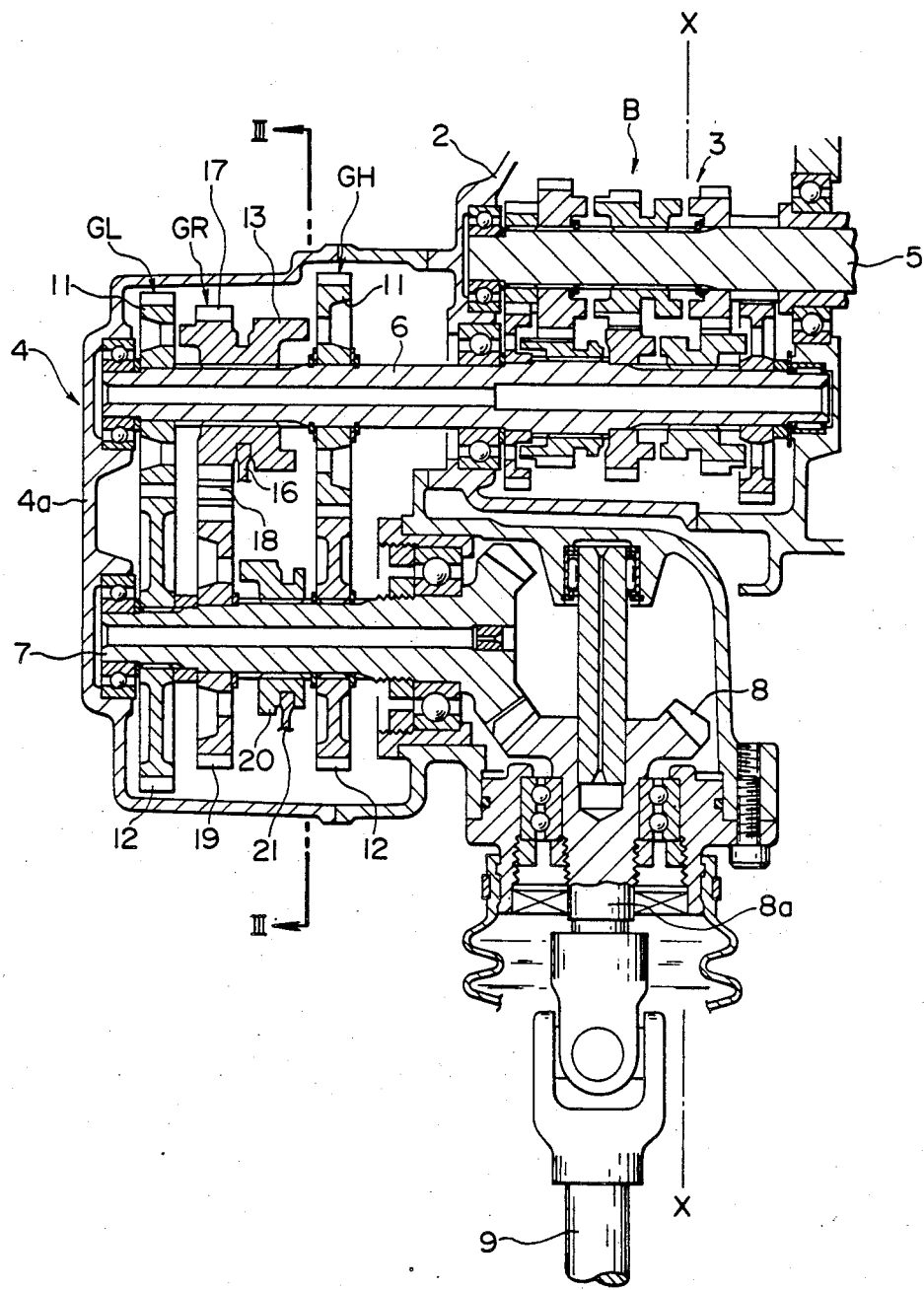
FIG. 2 is a cross sectional view of a gearbox assembly portion taken along line II—II in FIG. 1.

These drawings show the embodiment of this invention applied to a gearbox assembly B to be mounted on a motorized tricycle A for running on a rough road or off-road. Gearbox assembly B is mounted in rear of a crank case 2 of an engine 1. As shown in FIG. 2, the gearbox assembly comprises a pedal-operated main gearbox 3 similar to that employed in a highway motorcycle for providing plural forward motion gear-shift steps, for instance, five steps, and a lever-operated sub gearbox 4 positioned laterally and in parallel with the main gearbox 3 for providing two relatively high and low gear-shift steps, that is, two widely spaced gears. An output of the engine 1 is transmitted from a crank shaft (not shown) through an input shaft 5 of the main gearbox 3. The output shaft of the main gearbox 3 is linked to an input shaft 6 of sub gearbox 4 which is coaxial with the output shaft. In turn, the drive output is transmitted from an output shaft 7 of the sub gearbox 4 through bevel gears 8, a power shaft 8a, and a drive shaft 9 to driving or rear wheels 10. The engine outputs will be transmitted to the gearbox assembly B through, for instance, an automatic centrifugal clutch or another automatic type of clutch.

Figure 3:
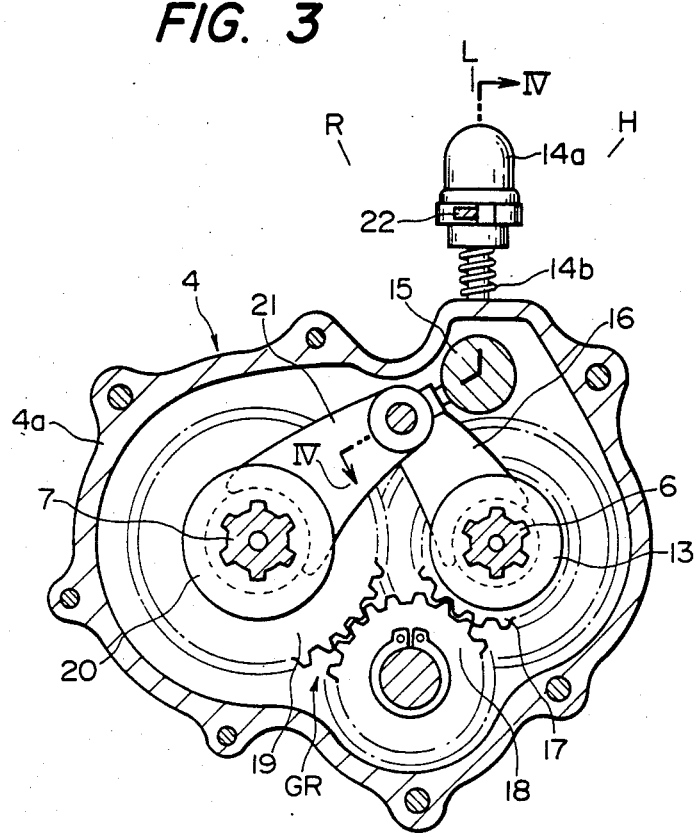
FIG. 3 is a cross sectional view taken along line III-—III in FIG. 2.
Figure 4:
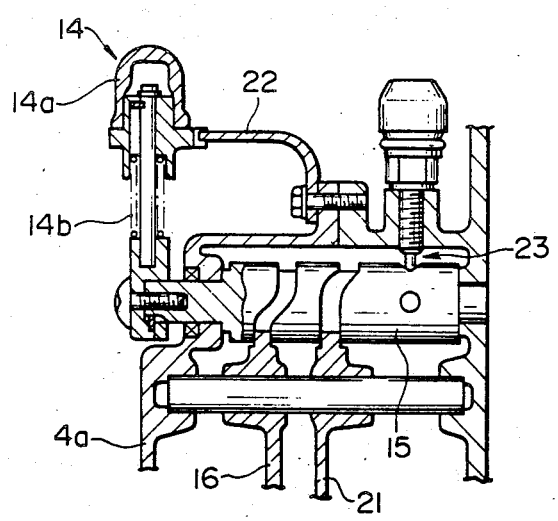
FIG. 4 is a cross sectional view taken along line IV—IV in FIG. 3.

Sub gearbox 4 includes a high speed transmission system GH on the right side as viewed in FIG. 2 and a low speed transmission system GL on the left side, both systems being spaced apart in the axial direction along and between the input and output shafts 6 and 7. Each of the transmission systems GH and GL is composed of a driving gear 11 mounted rotatably on the input shaft 6, and a driven or passive gear 12 fixedly mounted on the output shaft 7. Each driven gear 12 is always meshed with the corresponding driving gear 11. A first slider 13 is spline-engaged to an axial portion of the input shaft 6 and is slid or moved upon manipulation of a shift lever 14 provided in a case 4a of the sub gearbox 4 as shown in FIGS. 3 and 4. The shift lever 14 is directly connected to a shift drum 15, a circumferential groove of which guides a shift fork 16 axially engaged with the first slider 13, so that the driving gear 11 of either the transmission system GH or GL is selectively coupled to the input shaft 6 through the first slider 13 to establish engagement of either transmission system GH or GL.

Further, according to this invention, the sub gearbox 4 includes a reverse transmission system GR which will be established selectively upon manipulation of the one common shift lever 14. Specifically, this reverse transmission system GR is composed of a driving gear 17 integral with the first slider 13, an intermediate idle gear 18, and a driven gear 19 axially and rotatably mounted on the output shaft 7. A second slider 20 is mounted on output shaft 7 and is spline-engaged along its axis. Upon manipulation of the shift lever 14 with first slider 13 being in the neutral position, the second slider 20 is slid or moved leftwards by means of a second shift fork 21 engaged with a groove of the shift drum 15, and is thus coupled with the driven gear 19, to thereby establish engagement of the reverse transmission system GR. Accordingly, this reverse transmission system GR can be incorporated compactly and advantageously in the space between the high and low speed transmission systems GH or GL.

The shift lever 14 is manually swung to a forward "H" position shown in FIG. 3 to establish engagement of the high speed transmission system GH, to a middle "L" position for the low speed transmission system GL, or to a backward or rearward "R" position for the reverse transmission system GR. In the assembly shown in FIG. 4, to prevent an accidental shift of the shift lever 14 to the "R" position, a stopper 22 is provided which will abut against a knob 14a of the shift lever 14 when this lever 14 is attempted to be swung from the "L" position to the "R" position. Thus, the shift lever 14 cannot be moved to the "R" position unless a knob 14a is pushed down under opposition of a spring 14b.

In the drawing, "23" indicates a clip mechanism to latch shift drum 15 at each of the gear-shift positions.

The operation of the embodiment described above will be explained. In the case of forward running, the shift lever 14 of the sub gearbox 4 is set at the "H" position or "L" position, and a shift pedal (not shown) provided on the side opposite to lever 14 is adjusted to effect gear-shift operation of the main gearbox 3, resulting in a desired running condition. When the shift lever 14 is set at the "R" position, backward running is obtained. Here, if the reverse transmission system were incorporated in the main gearbox 3, it would be necessary in order th charge to reverse, to step on the shift pedal several times, this being a complicated manipulation and apt to cause mis-operation. In contrast, according to this invention, as described above, switching to reverse is simply achieved by manipulating one common shift lever 14. Furthermore, the frequency of operation upon the sub gearbox 4 is relatively low, and the lever shift positions are confirmed easily without inconvenience.

A second embodiment of this invention will be described with reference to FIGS. 5 to 8. The second embodiment is an improvement over the first embodiment.

Briefly, according to the first embodiment, the main gearbox and the sub gearbox are manipulated independently. Thus, it will happen that, with the main gearbox being in a high speed gear-shift step, the sub gearbox is changed into the reverse transmission state, resulting in a high speed backward running. Preferably, this should be prevented.

Figure 8:
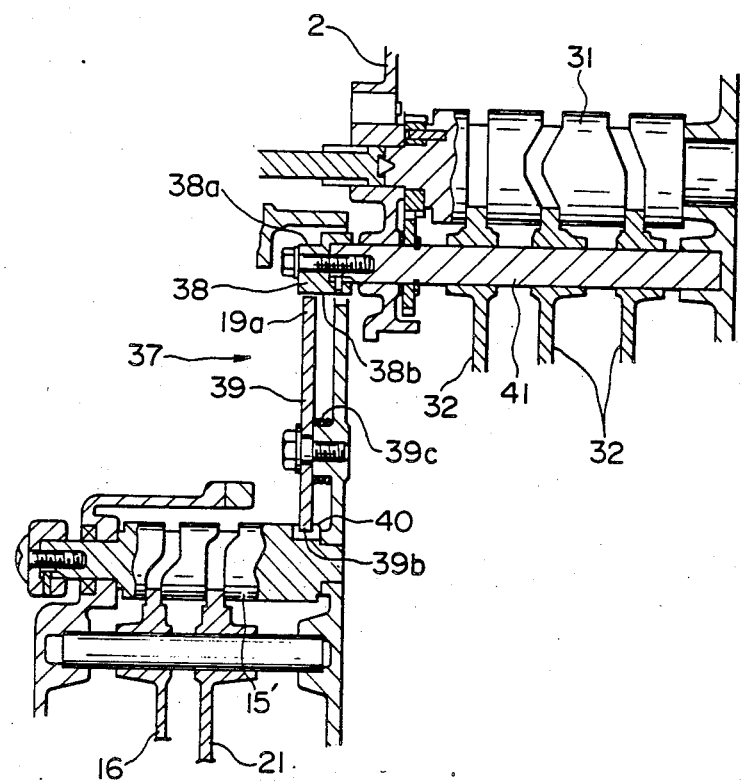
FIG. 8 is a cross sectional view taken along line VIII-—VIII in FIG. 7.

As shown in FIG. 8, the main gearbox 3 includes a gear-shift mechanism comprising a shift drum 31 interlinked to a shift pedal (not shown) and shift forks 32 engaging the former, and selectively establishes one of five speed transmission systems G1, G2, ..., G5. This mechanism is employed in the first embodiment, similar to one of the conventional mechanisms employed as a gearbox in a highway motorcycle, so it will not be described.

Figure 7:
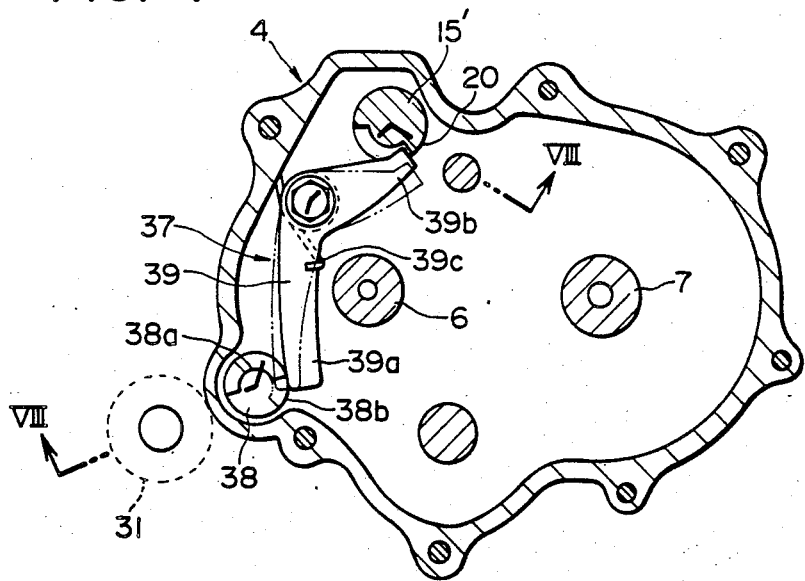

According to the second embodiment the sub gearbox 4 includes a stopper mechanism 37, which prevents a shift drum 15' from swinging to a position establishing a reverse transmission system GR, shown in a dotted line in FIG. 7. This stopper mechanism engages the shift drum 15' functioning as a rotary member for gear-shift operation, However, this stopper mechanism 37 is constructed so that its preventive operation is released only when main gearbox 3 is in neutral or in a low speed or first speed gear-shift step.

As shown in FIGS. 7 and 8, the stopper mechanism 37 comprises a cam 38 rotatable in response to the gear-shift operation of the main gearbox 3 and a stopper lever 39, its one end 39a facing the periphery of the cam 38 and the other end 39b facing the periphery of the shift drum 15'. Stopper lever 39 is pivotally supported at its middle portion and urged by a spring 39c so that one end 39a abuts against the periphery of cam 38.

A portion of the periphery of the cam 38, which is rotated so as to oppose lever 39 when main gearbox 3 is in neutral or in the first speed gear-shift position, is formed into a small radius portion 38a and the remaining portion is formed into a large radius portion 38b. A portion of the periphery of shift drum 15', which is rotated so as to oppose the other end 39b of the lever 39 when shift drum 15' swings to the reverse transmission position, is formed into a large radius projection 40. Specifically, as one end 39a of the lever 39 abuts against the large radius portion 38b or small radius portion 38a of cam 38, the other end 39b of lever 39 swings into or goes out of contact respectively with the rotating projection 40.

The cam 38 is mounted on a shift fork shaft 41 that is gear-meshed with the shift drum 31 of the main gearbox 3.

In operation, when the main gearbox 3 is in the second or higher speed gear-shift positions, as shown in FIG. 7, one end 39a of the stopper lever 39 is contacting the large radius portion 38b of the cam 38. Its other end 39b is advancing into the rotating projection 40 of the shift drum 15' of sub gearbox 4. Thus, rotation of drum 15' into the reverse position is prevented due to engagement of projection 40 with the other end 39b.

When main gearbox 3 is in neutral or first speed gear-shift position, one end 39a of the lever 39 abuts against the small radius portion 38a as shown in dotted lines in FIG. 7, and the other end 39b of lever 39 loses contact with the projection 40. Thus, rotation of the shift drum 15' into the reverse transmission position is allowed, resulting in a release of the stopper mechanism 37.

Further, is the stopper mechanism 37 is constructed as shown in the drawings, rotation of the shift drum 15' into the backward motion position prevents one end 39a of lever 39 from swinging in the direction leaving the cam 38 because of the contact of the other end 39b with the projection 40. In this way, rotation of the cam 38 is limited and gearshifting of the main gearbox 3 towards second or higher speed steps after the reverse transmission system is established is advantageously prevented.

Figure 5:
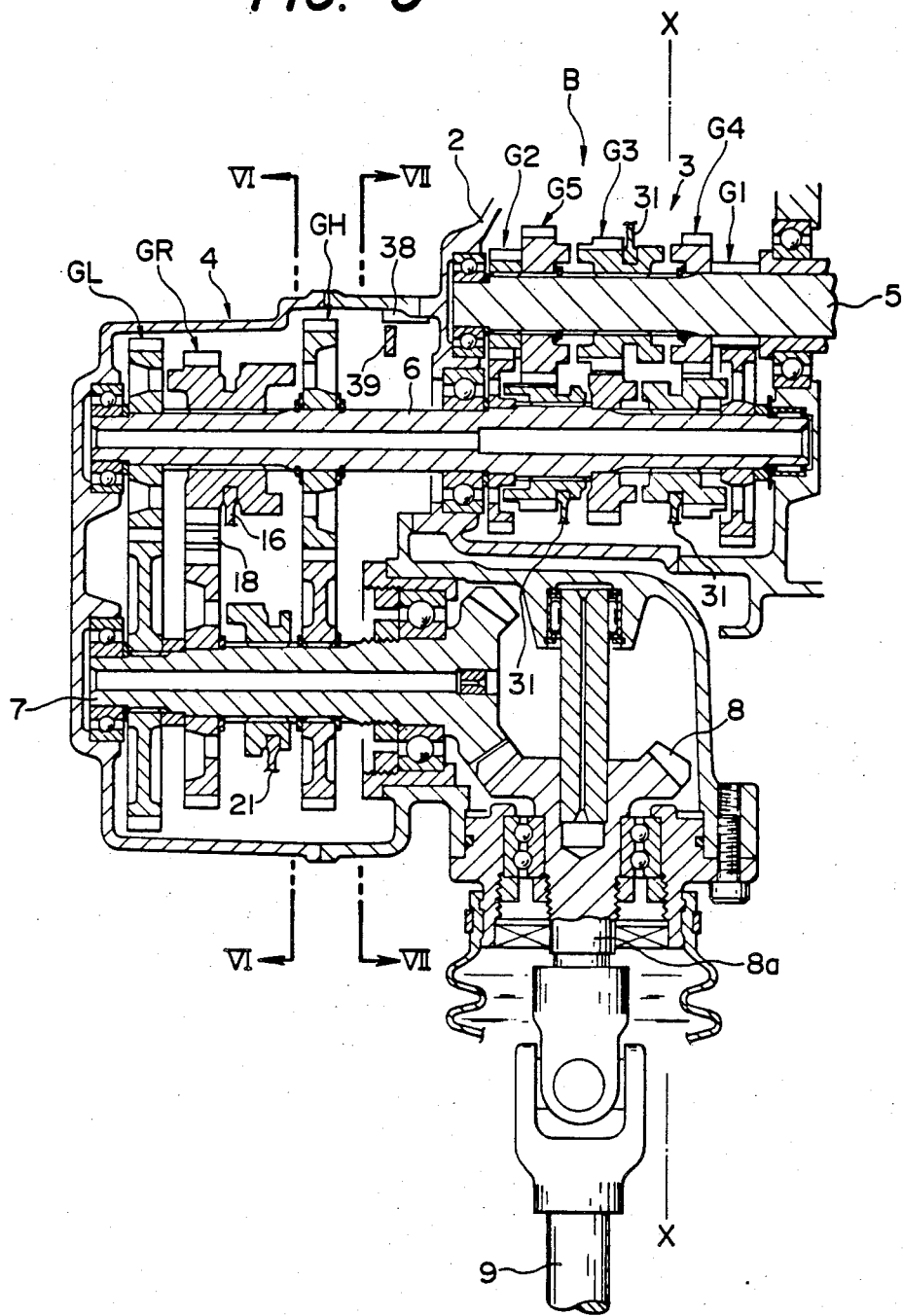
FIG. 5 is a cross sectional view similar to that of FIG. 2 showing a second embodiment of this invention.
Figure 6:
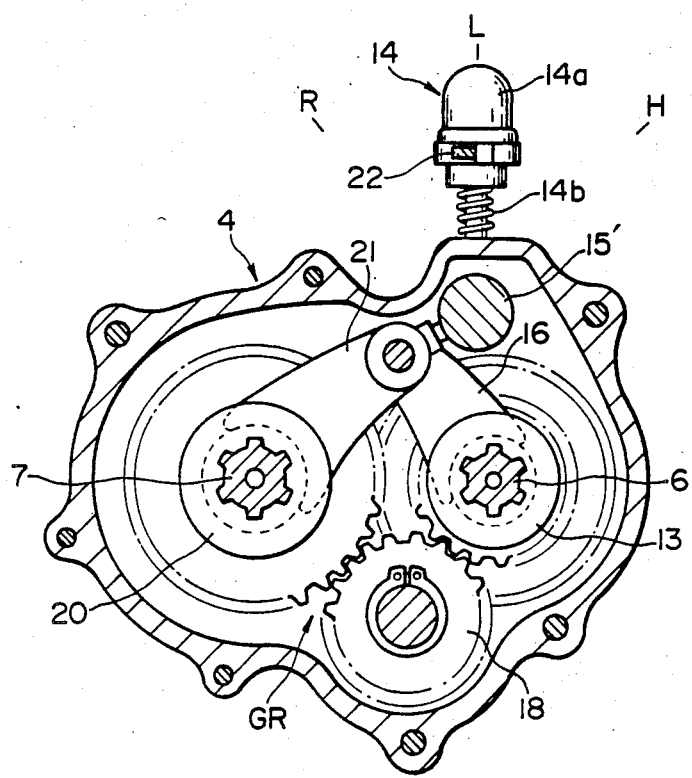
FIGS. 6 and 7 are cross sectional views taken along lines VI—VI and VII—VII, respectively, in FIG. 5.

In connection with the first and second embodiments, as seen from FIGS. 2 and 5, the power shaft 8a is positioned at a medial position of the vehicle body or frame relative to the sub gearbox 4. That is, in accordance with this invention, the engine and the following main gearbox are mounted at a central portion of a two-wheel vehicle frame, and the sub gearbox following the main gearbox is mounted at a position displaced to one side.

Figure 9:
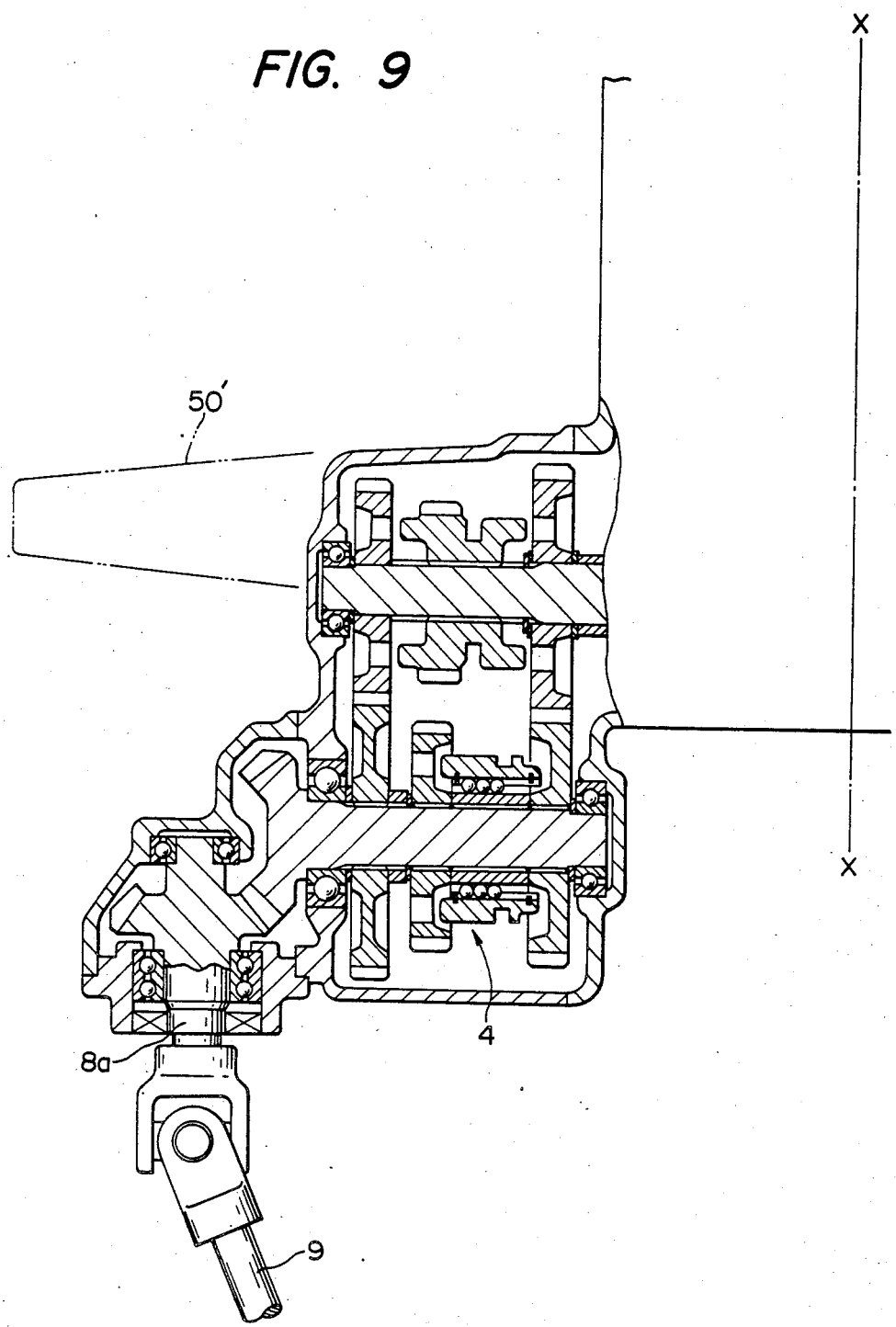
FIG. 9 is an explanatory diagram showing a positional relationship between a sub gearbox and a power carry shaft.

For the sake of example, as shown in FIG. 9, if the power shaft 8a were located at a displaced position on the same side as that for sub gearbox 4 relative to the longitudinal axis shaftline X—X shown in FIG. 5, with this shaft 8a being coupled to the drive shaft 9, the resultant shape has a large projection on that one side, and this projected portion will touch the driver's foot in view of the relative position of the foot-rest step 50' in front of the projected portion, thereby being inconvenient and reducing controllability.

In the first and second embodiments, the sub gearbox 4 includes the power shaft 8a positioned at a central or medial position of the vehicle frame A or near the axis shaftline X—X, which is interlinked to the drive shaft 9 extending rearwards. Specifically, output shaft 7 of sub gearbox 4 is coupled to the power shaft 8a at the central position of the vehicle frame A through a pair of bevel gears 8, 8 and, in turn, this shaft 8a is coupled to the drive shaft 9 extending rearwards.

As improvements of the first and second embodiments, the following structures are proposed, which will be described with reference to FIGS. 10 to 13.

Before describing the improvements, in the first and second embodiments, if the slider 20 is slidingly-moved to one side to engage a gear on that side to thereby establish a corresponding transmission system, and then, if that slider is moved to the opposite side to release the established transmission system, this transmission system is slightly under an influence of the output of the engine being in an idling state. That is, the torque of the engine output acts on the engaging portion between the gear and the slider and is apt to interfere with the release of engagement. Therefore, it is desirable to modify that slider into a lightly slidable type. Specifically, consider the condition where the main gearbox 3 is in a low speed gear-shift step, sub gearbox 4 is in the reverse transmission step, and the engine 1 is in the idling state with the vehicle standing still. The output of the engine is transmitted to the reverse transmission system R through a gear-shift clutch 57b (see FIG. 10) being in a contacted state due to a pull-sliding action of an automatic clutch 57a. Thus, a driving torque acts on the engaging portion between gear 19 and slider 20'. Because the reverse transmission system R has a large reduction gear ratio, the torque acting upon the engaging portion is large, so that in order to move the slider 20' to the right, as seen in the drawing, to release engagement, its operation may be slightly ragged.

Figure 10:
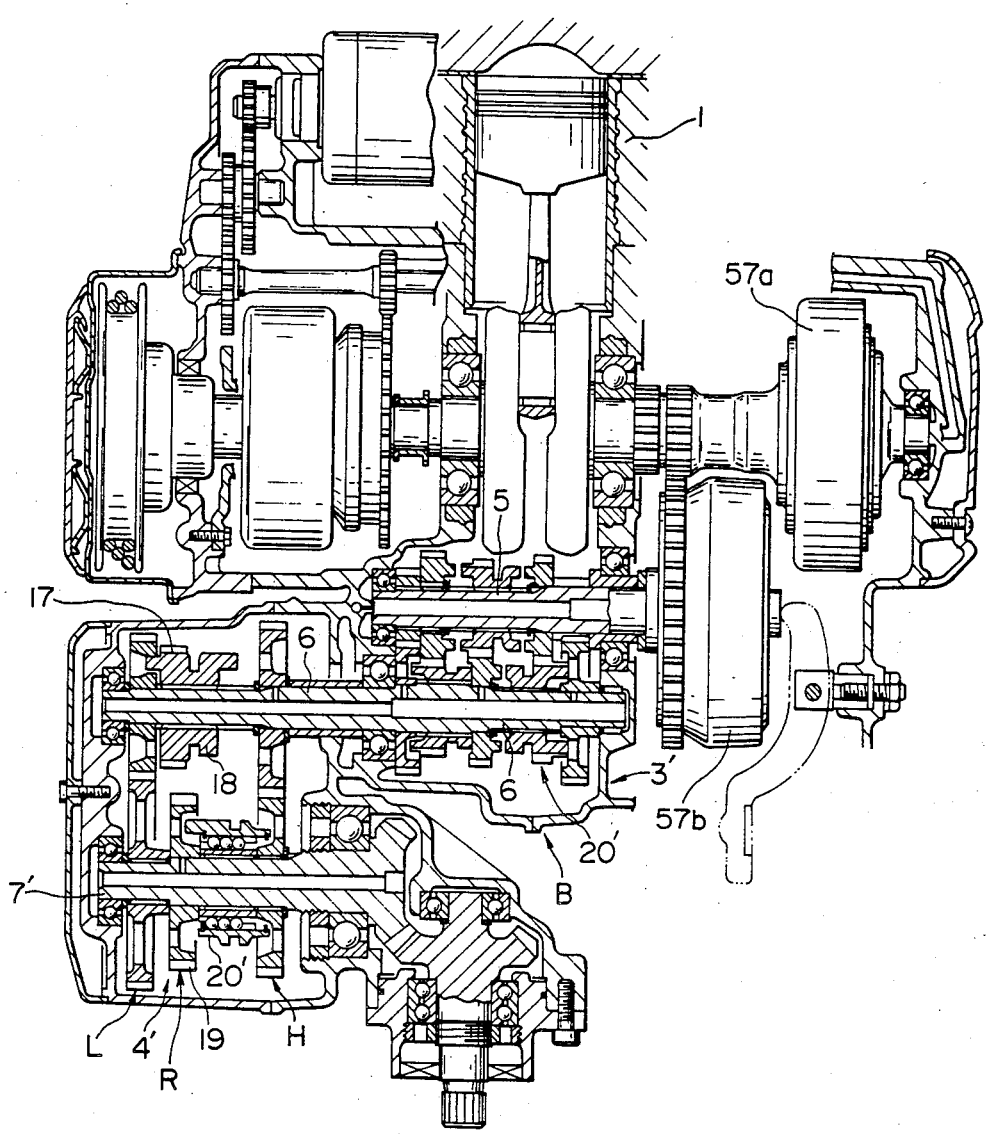
FIG. 10 is a cross sectional view showing a gearbox assembly portion of a third embodiment of this invention.

In FIG. 10, a gearbox assembly B is provided at the rear of engine 1 and coupled thereto through the automatic clutch 57a, of the automatic centrifugal type or the like, and the gear-shifting clutch 57b. This gearbox assembly B has a slider 20' on its shaft 7' for selecting a desired transmission system.

Figure 11:
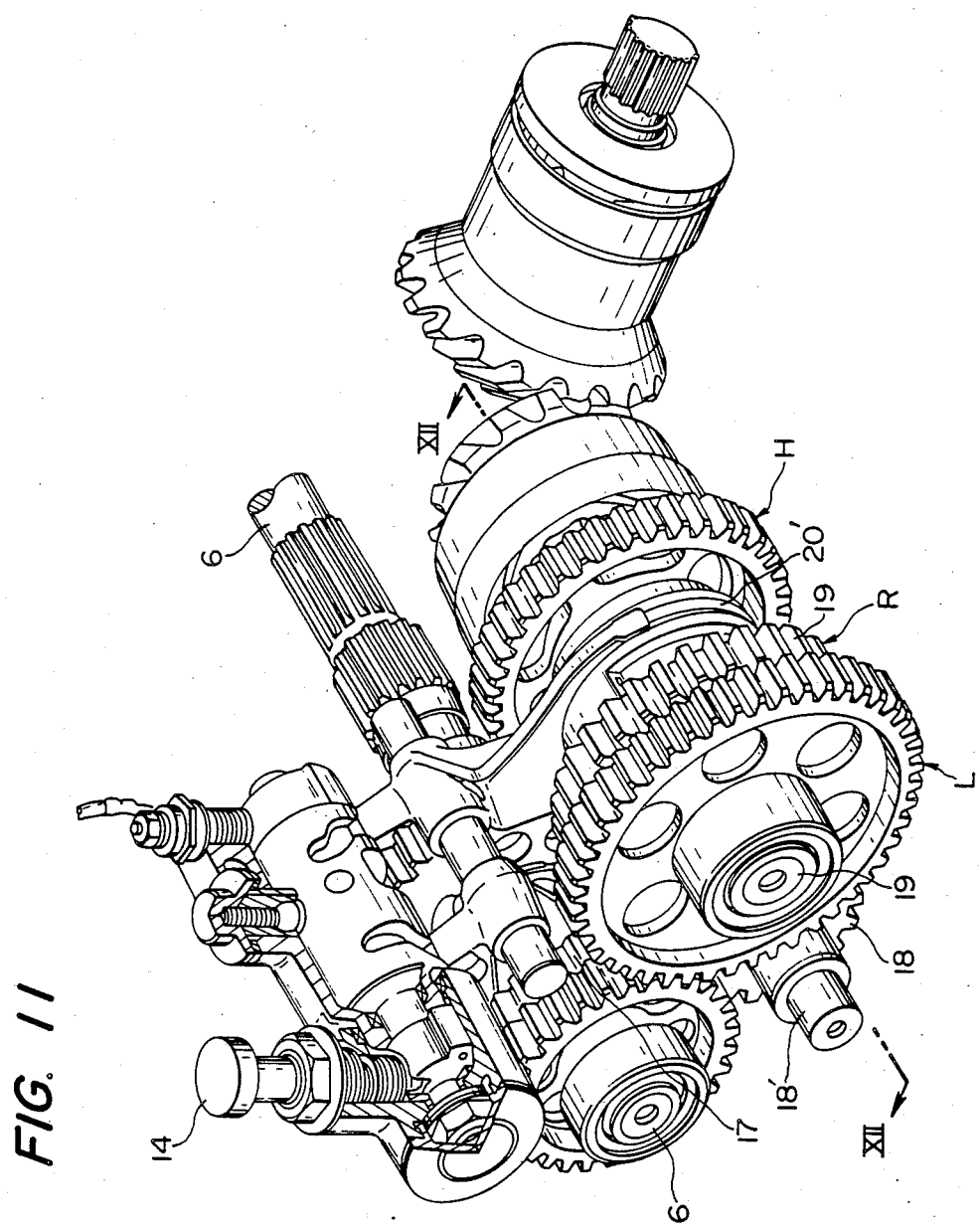
FIG. 11 is a perspective view showing the sub gearbox portion of FIG. 10.

The sub gearbox 4 is constructed as shown in FIG. 11. If the shift lever 14 is in the illustrated neutral position, the slider 13 on the input shaft 6 has slid to the left as shown in FIG. 10 and has selected the left side low speed transmission system L. Then, if the lever 14 is pushed down and forward, the slider 13 slides to the right and selects the right side high speed transmission system H. Then, if lever 14 is pushed down to the rear, the slider 13 returns to the neutral position, and the slider 20' on the shaft 7 moves leftwards and engages gear 19 to select the reverse transmission system R including that gear 19. Specifically, in response to the selection of the reverse transmission system R, the driving power is transmitted from gear 17 integral with the slider 13 through the idle gear 18 on the intermediate shaft 18' to the gear 19.

Figure 12:
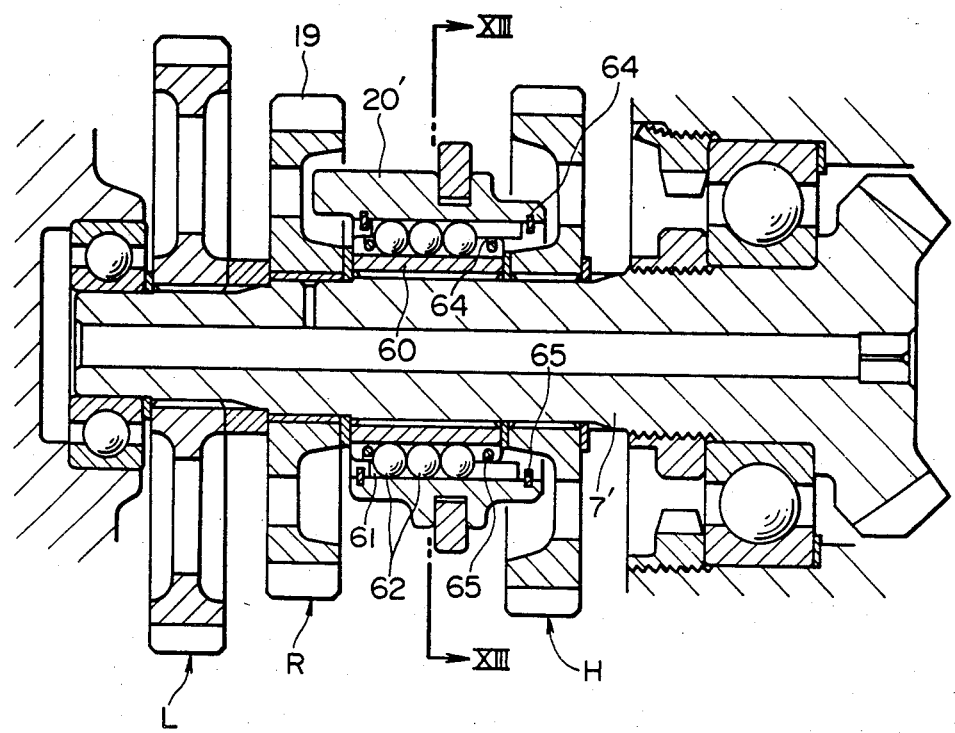
FIG. 12 is a cross sectional view taken along line XII—XII in FIG. 11.
Figure 13:
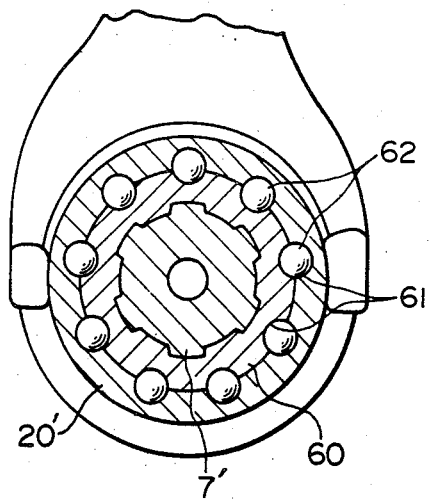
FIG. 13 is a cross sectional view taken along line XIII—XIII in FIG. 12.

To eliminate some drawbacks of the first and second embodiments, in accordance with the improvements of this invention, as shown in Figs. 12 and 13, slider 20' is slidably fitted around the outer periphery of slider collar 60 which is in turn spline-engaged with shaft 7'. In the mutually-facing peripheral surfaces of slider 20' and collar 60 a plurality of ball bearing grooves 61 are formed extending in parallel with the axis shaft-line of shaft 7' with a desired spacing therebetween on the common circumference. Each ball bearing groove 61 receives rotatably a desired number of ball bearings 62, so that the slider 20' is engaged to collar 60 through ball bearings 62, and slides smoothly and easily along the axis of the collar 60.

For convenience in assembling, at each end portion of the inner peripheral surface of the slider 20' and of the outer peripheral surface of the collar 60 is formed a clip groove 64 into which its individual clip 65 is removably fitted.

According to the improvements of this invention, as described above, in the mechanism where the output of the engine is transmitted through the automatic clutch and the gearbox assembly to the driving wheels, the slider for gear-shift operation in the gearbox assembly is provided with ball bearings stored in the ball bearing grooves formed between the slider and the slider collar, with the slider collar located inside the slider. Thus, even if the torque from the engine acts somewhat on the slider, easy release of the gear-shift engagement is achieved and gear-shifting becomes easy and simplified. Further, the structure is simplified and the cost reduced.

According to this invention, as described above, because the reverse transmission system is incorporated in the sub gearbox, a gearbox of a highway motorcycle or the like is employable as the main gearbox without modification, manipulation of one common operation lever of the sub gearbox can achieve shifting to reverse. Thus, this novel arrangement is advantageous and effective in manipulating the vehicle.

Further, by means of the stopper mechanism, shifting to reverse in the sub gearbox is allowed only when the main gearbox is in neutral or in the low speed gear-shift step.

Furthermore, the power shaft is positioned at a center position of the vehicle frame or on the central side of the sub gearbox located at a displaced position relative to the vehicle center. It is interlinked to the drive shaft, so that the drawbacks resulting from the arrangement shown in FIG. 9 are effectively eliminated.

What is claimed is:

1. A gearbox assembly for a vehicle for transmitting an output of an engine to driving wheels of the vehicle, comprising:
    a main gearbox (3) receiving said output and having plural forward gear-shift steps;
    a shift lever (14);
    a sub gearbox (4) coupled to an output of said main gearbox having at least two relatively high and low speed gear-shift steps (GH, GL) and a reverse transmission system (GR), said two steps and said reverse transmission system being selectively established through switching operation of said shift lever;
    wherein said sub gearbox further comprises:
    a rotary member (15) connected to said shift lever for selecting one of said steps and said reverse transmission system according to its rotation;
    a stopper mechanism (I5', 39b) engaging said rotary member for preventing said rotary member from rotating to a position where the reverse transmission system is established; and
    interlinking means (39, 38) between said stopper mechanism and said main gearbox for releasing said stopper mechanism only when said main gearbox is in neutral or in a low speed gear-shift step;
    wherein said stopper mechanism comprises:
    a cam (38) rotatable in response to the gear-shift operation of said main gearbox;
    a stopper lever (39) one end (39b) of which faces the periphery of said cam and the other end (39a) facing said rotary member, said stopper lever being pivotally supported at its middle portion; and
    a spring (39c) urging said stopper level to abut against the periphery of said cam;
    wherein a portion of the periphery of said cam, which is rotated so as to oppose the one end of said lever when said main gearbox is in neutral or in a low speed gear-shift, is formed into a small radius portion and the remaining peripheral portion is formed into a large radius portion;
    wherein a portion of the periphery of said rotary member which is rotated so as to oppose the other end of said lever when said rotary member rotates to the reverse transmission position is formed into a large radius projection; and
    wherein the other end of said lever is swung into or out of the rotation locus of said projection when the one end of said lever abuts against the large radius portion or the small radius portion respectively of said cam.

2. A gearbox assembly for vehicles having front and rear wheels and a drive shaft (9) connected to said rear wheel, as claimed in claim 1:
    wherein the engine and said main gearbox following said engine are mounted along a longitudinal direction at a center portion of the vehicle frame, said sub gearbox following said main gearbox being mounted at a position displaced to one side of said main gearbox; and
    wherein said sub gearbox includes a power shaft (8a) positioned at a center position of the vehicle on the same side of said sub gearbox as said main gearbox, said power shaft being interlinked to said drive shaft.

* * * * *